May 15, 1962    M. N. BENNISON    3,034,458
STITCHING OF MATERIALS
Filed July 17, 1959    3 Sheets-Sheet 1
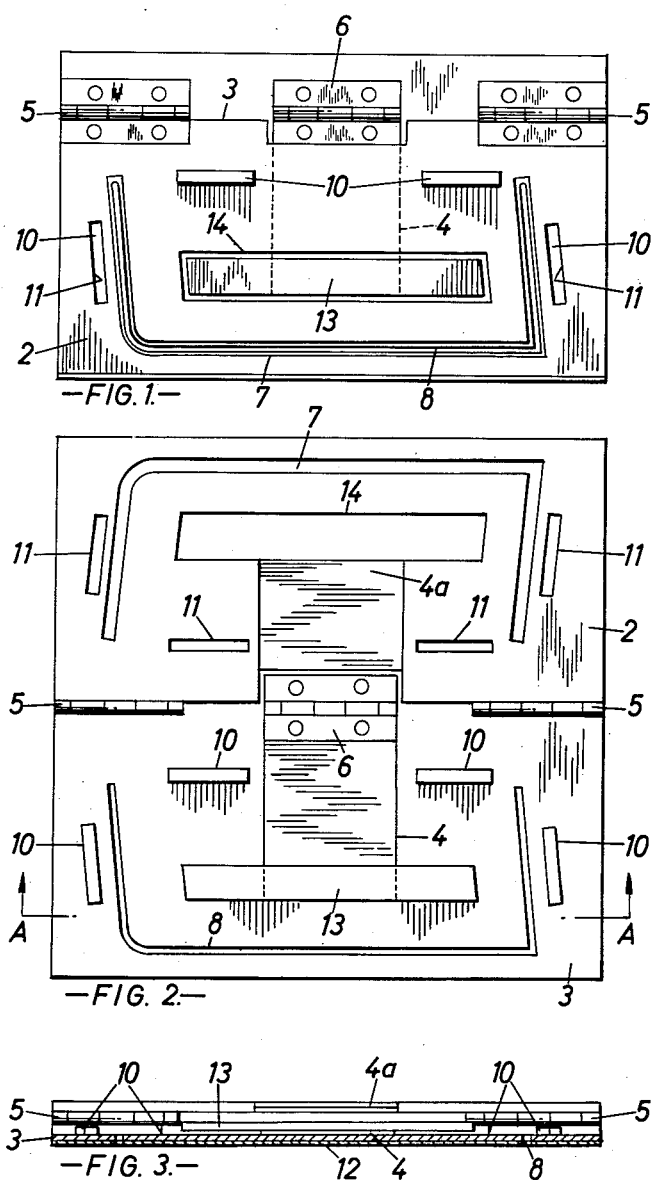
INVENTOR
Michael Newstead Bennison
BY
Pierce, Scheffler & Parker
ATTORNEYS May 15, 1962 M. N. BENNISON 3,034,458
STITCHING OF MATERIALS
Filed July 17, 1959 3 Sheets-Sheet 2
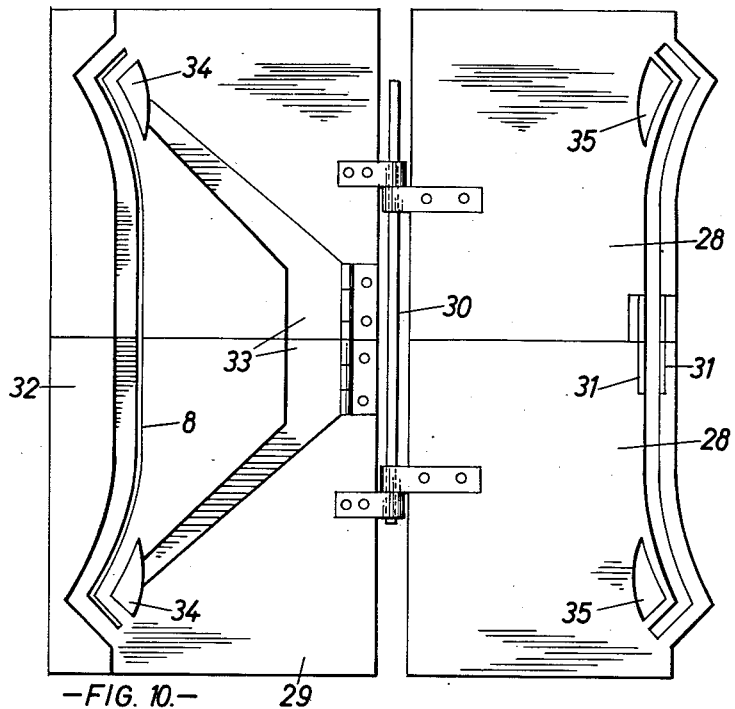
—FIG. 10.—
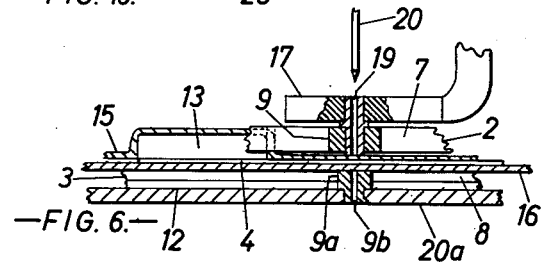
—FIG. 6.—
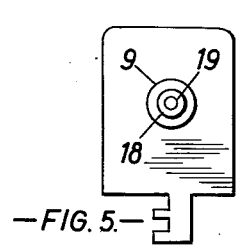
—FIG. 5.—
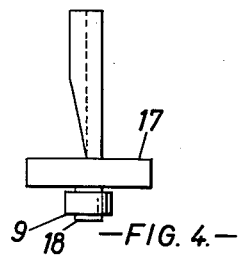
—FIG. 4.—
INVENTOR
Michael Newstead Bennison
BY
Pierre, Scheffler & Parker
ATTORNEYS

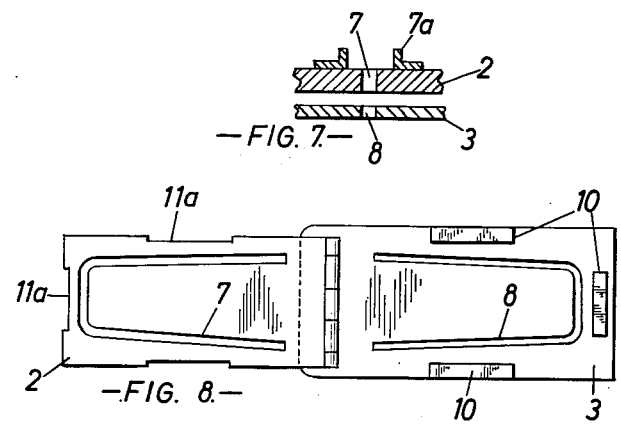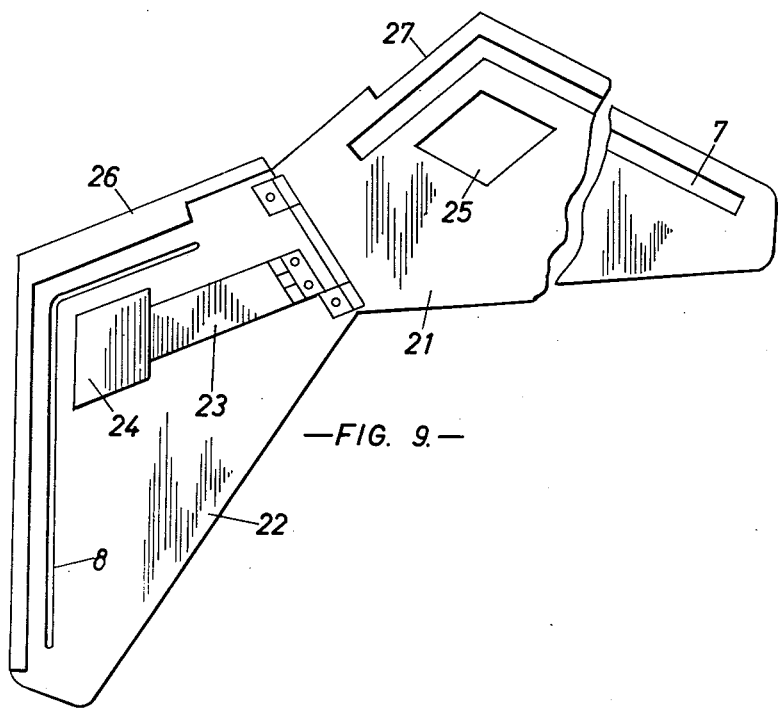

United States Patent Office 3,034,458
Patented May 15, 1962

3,034,458
STITCHING OF MATERIALS
Michael N. Bennison, Leeds, England, assignor to Clarkson (Textiles) Limited, Leeds, England, a British company
Filed July 17, 1959, Ser. No. 827,864
Claims priority, application Great Britain Sept. 19, 1958
10 Claims. (Cl. 112—2)

This invention relates to methods of, and means for, facilitating the stitching of materials together by a sewing machine in a predetermined manner.

In the manufacture of some articles, particularly articles of clothing, certain operations involve the stitching together of at least two layers of material in a particular manner and this requires skilled operators. For example, in the manufacture of pocket flaps the operator has not only to stitch around the edges of the two layers of material but at the same time has to ensure that there is a slightly greater area of outer cloth than lining to ensure proper shaping of the flap. Other instances of skilled operators being required are the manufacture of, say, the collars of coats, jackets, shirts, blouses or similar garments and the cuffs thereof.

The main object of the present invention is to provide an improved method of, and means for, facilitating the manufacture of shaped parts of garments or other articles wherein two or more layers of material are stitched together.

Accordingly there is provided a method of controlling the stitching together of layers of material, consisting in locating required layers of material in interleaved arrangement between a preformed unitary plate template provided with needle passage openings, and controlling the working movement of the template on a work surface in correct predetermined relationship to a sewing machine needle so that the latter will automatically stitch through the said passage openings in the unitary template and secure the layers of material together with a required line or lines of stitching.

The invention includes guide means for stitching operations, comprising a unitary template of superposed plates between which layers of material can be interposed, at least one needle passage opening or slot of a predetermined contour through the plates, and a guide track complementary to each needle passage opening and adapted to receive a member on the sewing machine, whereby the template with interleaved layers of material can be moved in correct relationship to the needle for the stitching therethrough of the interposed layers of material.

The needle passage opening in the upper plate may also form the guide track.

The unitary template may have three superposed plates with a material fulling protuberance on the upper face of the middle plate and a complementary opening for the protuberance in the upper plate, whereby a layer of material between these two plates will be a predetermined amount greater in area than the flat layer or layers of material between the middle and bottom plate.

The improved unitary template may have its plates hinged or otherwise held together along one edge. The plates may have securing means for holding them closed for a stitching operation.

The invention will now be more particularly described with reference to the accompanying drawings in which:

FIG. 1 is a plan view of a unitary template for forming pocket flaps for garments;

FIG. 2 is a plan view of the template with the top plate laid back;

FIG. 3 is a section on line A—A of FIG. 2;

FIG. 4 is an elevation of a foot-guide device for attachment to a sewing machine;

FIG. 5 is a plan view from below of FIG. 4;

FIG. 6 is a part-sectional detail elevation showing the foot-guide device and unitary template located together;

FIG. 7 is a sectional detail of a modified form of track for the upper plate of the template;

FIG. 8 is a plan view of a template for forming garment tabs with the upper plate laid back;

FIG. 9 is a plan view of another form of template for forming lapel points for garments with the upper plate laid back; and FIG. 10 is a further modified template in plan view for forming garment collars with the upper plate laid back.

In a particular embodiment of this invention shown in FIGS. 1 to 3, a unitary template is constructed for use in the manufacture of pocket flaps. The template comprises three plates 2, 3 and 4 located in superposed relationship and hinged together by hinges 5 and 6 along the longitudinal rear edge. Around the other three sides of the template, at a predetermined distance from the edges, is provided a narrow needle passage slot 7 and 8 in each of the plates 2, 3 and substantially of U-formation to suit the line of stitching required to form a pocket flap. Usually, as shown, such stitching line comprises two straight slightly angled endlines joining a longitudinal line by means of a radiused corner at the front end and a substantially right-angled corner at the rear end.

For simplicity of construction the slot 7 through the upper plate 2 is made wider than the slot 8 in the bottom plate 3 so as to form a guide track for the hereafter described guide roller 9. Also, location pieces 10 are secured to the upper face of bottom plate 3 to enter openings 11 in the upper plate. These pieces serve the dual purpose of registering the two plates correctly and also locating material layers between the plates. Moreover, the bottom plate 3 is shown with an underneath layer 12 of material, which may be of a substantially non-slip type, or the plate may be flock-sprayed, for the purpose of providing good control of the template when being moved on a work plate or surface.

As it is customary in the formation of pocket flaps to provide a slightly greater area of cloth than lining the middle plate 4 is furnished on its upper face with a fulling protuberance or raised part 13. This fulling part is of parallelogram formation substantially following the line of the needle passage slot 8, and the upper plate is furnished with a complementary opening 14 therethrough. Plate 2 is also recessed on its undersurface at 4a to accommodate the plate 4. Thus, as shown in FIG. 6, when the upper plate 2 is superposed down on to material 15 interposed between the two plates 2, 4 part of the cloth will be raised up through the opening 14 so that in effect a slightly greater amount of material 15 is drawn or gathered in automatically than will be the case with a lining material 16 laid flat between the middle and bottom plates 4 and 3. The said raised fulling part and complementary opening may be of some other formation to suit requirements.

The above unitary template is adapted to be used with a sewing machine which is furnished with a foot 17 provided with a guide roller 9 (or equivalent part) which will fit freely into the aforesaid guide track 7. The roller 9 is rotatably mounted on a pin 18 secured through the foot 17 and this pin has an axial hole 19 for the free working therethrough of a sewing machine needle 20. To ensure even stitching of the material the usual sewing machine feed platens are used to engage the underface of the template, but instead of the platens having serrated edges they are adapted to have a frictional grip on the template, e.g. the platens may have frictional pieces secured thereto. Also, to control the material during stitching, a stud 9a, furnished with an axial needle passage hole 9b, is secured down on to the machine workplate 20a to enter the slot 8 with clearance. A gap is left between the stud and roller 9 to accommodate the material to be stitched and the stud prevents depression of the material as the needle passes therethrough.

Thus with material 15, 16 interleaved into the template the latter can be located on the sewing machine workplate, the foot 17 lowered for the roller to enter the track and then stitching operations can be commenced from one end of the needle passage slot and by simply manipulating the template round on the workplate as it is advanced by the feed platens the line of stitching will automatically follow a predetermined line and thus the stitching of the pocket flap is facilitated. Where a sharp corner has to be turned in the stitching line it may be found necessary to allow a slight enlargement of the guide track to ensure an easy turning relationship between template and sewing machine foot. Moreover, it will be understood that clamping or other securing means may be provided for holding the unitary template closed firmly on to the interleaved material.

A very simple construction is achieved by using the upper slot 7 as a guide track, but the invention may be modified by providing, as shown in FIG. 7, on the upper face of the top plate 2 a guide track 7a running parallel with the needle passage slot 7 and so formed that in effect a channel section guide track is provided. It will be appreciated that whilst the guide track 7a can be arranged so that the channel walls are one each side of the needle passage slot 7 it may be located wholly to one side thereof and the foot or other engagement means on the sewing machine constructed in relation to the needle to suit. Such foot or means may be adapted to replace or be additional to the usual presser foot of the machine.

The unitary template may be modified to suit the type of stitching operation to be carried out and need not necessarily be furnished with the aforesaid protuberance and opening if the upper layer of material has to lie flat. In FIG. 8, for example, a template is shown for stitching tabs for garments which do not require the outer layer of material to be fulled. Two hinged together plates 2, 3 are provided with U-shaped needle passage slots 7, 8 of which 7 also forms a guide track. Again location pieces 10 are provided with recesses 11a in the top plate.

FIG. 9 shows a template for forming lapel points for garments. Here two hinged together plates 21, 22 have an intermediate plate 23 hinged to plate 22 and carrying a fulling plate 24 to be located in opening 25 in the top plate. Needle passage slots 7, 8 of L-shape are furnished in plates 21, 22 and the latter has a location piece 26 with a recess 27 in the edge of plate 21.

FIG. 10 shows a template for forming collars for garments and although it may be made to a given size, is shown extendible for variation in collar size. The plates 28, 29 are divided and connected by an adjustable hinge 30. Also, guide track slot 7 in this case has slot extension guides 31 secured to one half and top plate 28 has its front edge complementary to the inner edge of location piece 32. The intermediate plate 33, also divided, carries a pair of fulling plates 34 to enter openings 35 in the top plate.

A template may be constructed to allow two or more articles to be produced therein.

What I claim is:

1. A device for stitching at least two layers of material together, comprising upper and lower plates forming a template and between which plates said layers of material are interposed, at least one pair of aligned needle passage slots of a predetermined contour formed in said upper and lower plates respectively, means forming a guide track extending along said needle passage slots and adapted to receive a needle guide member on part of the sewing machine, and fulling means disposed between the material layers and being of such shape as to give at least one layer of the material an area greater than that of another layer, whereby said template with the layers of material interposed between the template plates can be moved in correct relationship to the needle for stitching therethrough of the material layers and with at least one layer having fullness of a predetermined amount as determined by said fulling means.

2. A device as defined in claim 1 for stitching layers of material together wherein said guide track is established by making the slot in said upper plate wider than the slot in said lower plate.

3. A device as defined in claim 1 for stitching layers of material together wherein said means forming said guide track in constituted by a guide channel provided on said upper plate, said guide channel being separate from but following the contour of the slot in said upper plate.

4. A device as defined in claim 1 for stitching layers of material together wherein said upper and lower plates are interconnected by hinge means extending along one side thereof and which further includes at least one protuberance upstanding from the inner face of one of said plates adapted to enter an opening of complementary configuration in the other plate for maintaining said plates in accurate alignment.

5. A device as defined in claim 1 for stitching layers of material together wherein said fulling means is constituted by a third plate interposed between said upper and lower plates, said third plate being provided on one face thereof with a material fulling protuberance adapted to enter an opening in said upper plate having a configuration generally complementary to said protuberance.

6. A device as defined in claim 5 for stitching layers of material together to form a pocket flap wherein said material fulling protuberance on said third plate has a configuration of a parallelogram substantially following the contour of said aligned needle passage slots in said upper and lower plates.

7. A device as defined in claim 5 for stitching layers of material together wherein said upper and lower plates are hinged together along one side and said third plate is hinged to said lower plate along a side opposite to the protuberance thereon.

8. A device as defined in claim 7 for stitching layers of material together wherein the hinges for all of said plates are disposed at the same side of the plate and the hinge for said third plate is disposed between hinges interconnecting said upper and lower plates.

9. Sewing apparatus comprising a sewing machine, said machine being provided with a foot having a guide member beneath the same, said foot and guide member having a needle passage therethrough, and a workplate disposed beneath said foot and guide member and provided with an upstanding stud having a needle passage in alignment with the needle passage through said foot and guide member; and a template for stitching at least two layers of material together, said template comprising upper and lower plates between which the layers of material are interposed, at least one pair of aligned needle passage slots of a predetermined contour formed in said upper and lower plates, respectively, means forming a guide track extending along said needle passage slots and which receives said guide member, said stud on said workplate entering into said slot in said lower plate of said template and serving as a rest for material in said template during the stitching operation, and fulling means disposed between the material layers and being of such shape as to give at least one layer of the material an area greater than that of another layer, whereby said template with the layers of material interposed between the plates thereof can be moved in correct relationship to the needle for stitching therethrough of the material layers and with at least one layer having fullness of a predetermined amount as determined by said fulling means.

10. Sewing apparatus as defined in claim 9 wherein said guide member beneath said foot is constituted by a roller for facilitating movement of said template.

References Cited in the file of this patent

UNITED STATES PATENTS

| | | |
|---|---|---|
| 1,979,789 | Barrett | Nov. 6, 1934 |
| 2,094,528 | Daughters | Sept. 28, 1937 |
| 2,863,408 | Abel | Dec. 9, 1958 |

FOREIGN PATENTS

| | | |
|---|---|---|
| 653,177 | Great Britain | May 9, 1951 |